US012752443B2

(12) United States Patent
Nakayama

(10) Patent No.: US 12,752,443 B2

(45) Date of Patent: Oct. 6, 2026

(54) ACTUATOR AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 19/194,139

(22) Filed: Apr. 30, 2025

(65) Prior Publication Data

US 2025/0256413 A1 Aug. 14, 2025

Related U.S. Application Data

(63) Continuation of application No. PCT/JP2023/009914, filed on Mar. 14, 2023.

(51) Int. Cl.
*B25J 9/12* (2006.01)
*B25J 9/00* (2006.01)
*B25J 19/00* (2006.01)

(52) U.S. Cl.
CPC ......... *B25J 19/0029* (2013.01); *B25J 9/0009* (2013.01); *B25J 9/126* (2013.01)

(58) Field of Classification Search
CPC .... B25J 19/0029; B25J 19/0041; B25J 9/126; B25J 9/0009; B25J 19/0025
See application file for complete search history.

(56) References Cited

U.S. PATENT DOCUMENTS

| | | | | |
|---|---|---|---|---|
| 5,240,092 A * | 8/1993 | Eachus | H02G 11/00 439/13 |
| 10,840,758 B2 * | 11/2020 | Mizukoshi | F16C 33/768 |
| 11,331,815 B2 * | 5/2022 | Nakayama | B25J 19/0029 |
| 12,251,824 B2 * | 3/2025 | Hsu | B25J 9/0009 |
| 2020/0406479 A1 * | 12/2020 | Nakayama | B25J 13/085 |

FOREIGN PATENT DOCUMENTS

| | | | |
|---|---|---|---|
| JP | 1995H07246587 A | 9/1995 |
| JP | 2002011687 A | 1/2002 |
| JP | 2017159397 A | 9/2017 |
| WO | 2022138370 A1 | 6/2022 |
| WO | 2023026434 A1 | 3/2023 |

* cited by examiner

*Primary Examiner* — Gregory Robert Weber
(74) *Attorney, Agent, or Firm* — John A. Miller; Shumaker, Loop & Kendrick, LLP

(57) ABSTRACT

An actuator including a fixed member, a mobile member, a hollow hole penetrating the actuator, an umbilical member passing through the inside of the hollow hole, a first fixing part having a first gripping part that grips one portion of the umbilical member, and a second fixing part having a second gripping part that grips another portion of the umbilical member. The first gripping part and the second gripping part are positioned inside of the hollow hole.

6 Claims, 9 Drawing Sheets

ACTUATOR AND ROBOT

CROSS-REFERENCE TO RELATED APPLICATIONS

This application is a bypass continuation application of International Application No. PCT/JP2023/009914 filed Mar. 14, 2023.

BACKGROUND

Field

The present disclosure relates to an actuator and a robot.

Discussion of the Related Art

Industrial robots, particularly articulated robots, include at least one joint in which two links are connected to each other. Each joint is provided with an actuator for driving the link, and at least a power line and a signal line for driving the actuator are required. Furthermore, signal lines for driving the end effector installed at the tip of the industrial robot, air piping, and signal lines for high-speed communication are required. In the present description, these power lines, air piping, and various signal lines are collectively referred to as a "filamentary bodies."

In Japanese Unexamined Patent Publication (Kokai) No. 2017-159397, an actuator comprises a fixed member and a movable member which rotate relative to each other. A filamentary body penetrates the interior of the actuator, and the filamentary body is affixed to the fixed member and the movable member by a first fixed part and a second fixed part, respectively.

However, in the prior art, the first fixed part and the second fixed part protrude outside the actuator. Thus, there is a problem in that the robot arm comprising the actuator and the robot become large.

Thus, there is a demand for an actuator which enables a reduction in size of the robot and the robot arm.

SUMMARY

According to a first aspect of the present disclosure, there is provided an actuator comprising a fixed member, a movable member which rotates relative to the fixed member, a hollow hole which penetrates the actuator, a filamentary body which passes through an interior of the hollow hole, a first fixed part including a first gripping part for gripping a portion of the filamentary body, and a second fixed part including a second gripping part for gripping another portion of the filamentary body, wherein the first gripping part and the second gripping part are positioned inside the hollow hole, a distance between the first gripping part and the second gripping part is shorter than a length of the hollow hole, and a length of the filamentary body between the first gripping part and the second gripping part gripped by the first gripping part and the second gripping part is longer than a length of the hollow hole.

The objects, features, and advantages of the present disclosure will become more apparent from the following description of the embodiments in conjunction with the accompanying drawings.

DETAILED DESCRIPTION OF THE EMBODIMENTS

Figure 1:
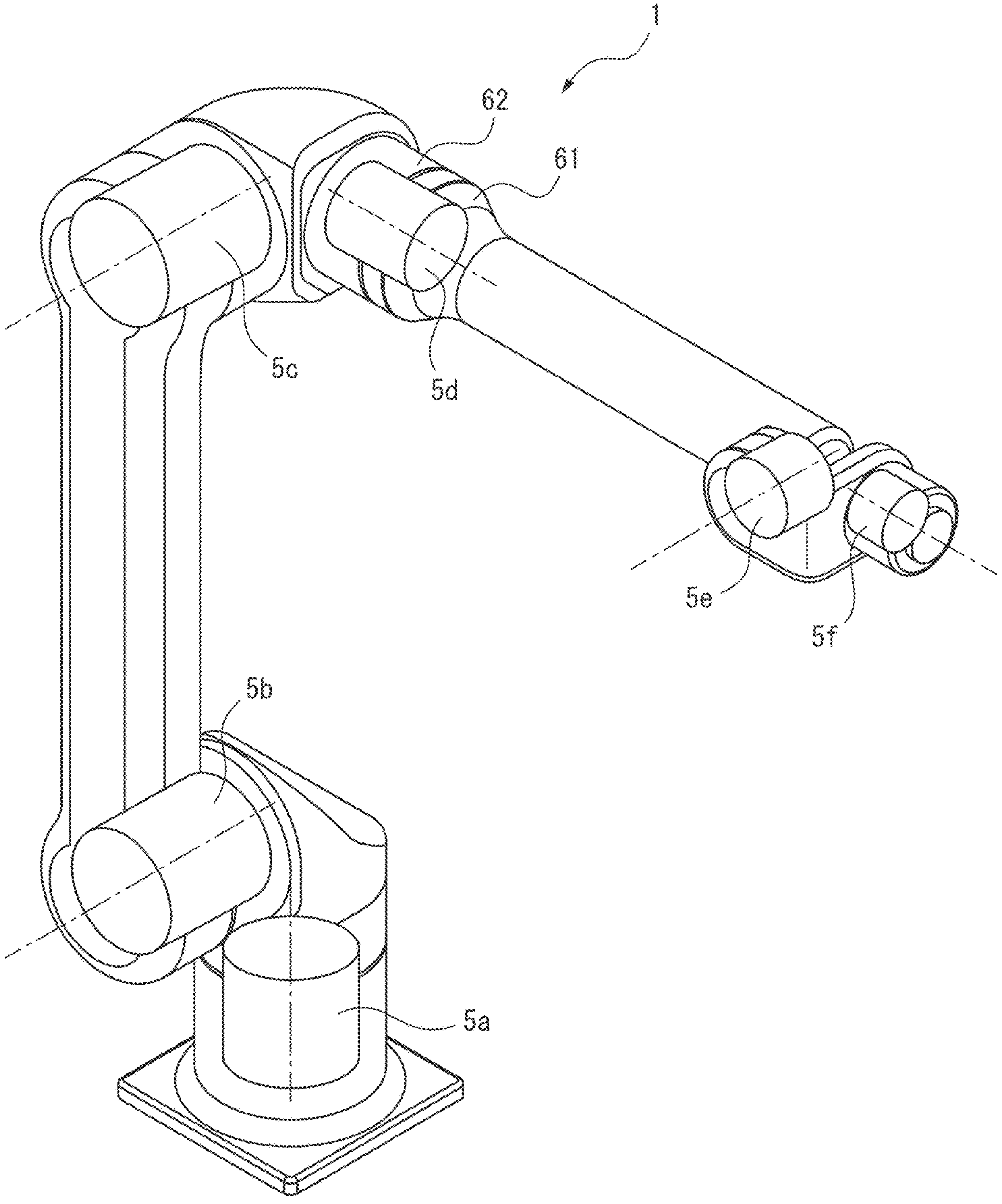
FIG. 1 is a perspective view of a robot comprising an actuator based on a first embodiment.

The embodiments of the present disclosure will be described below with reference to the attached drawings. In the drawings, corresponding constituent elements have been assigned common reference signs.

FIG. 1 is a perspective view of a robot comprising an actuator according to a first embodiment. Each of a plurality of joints of a robot 1, for example, a vertical articulated robot, comprises actuators 5*a* to 5*f*. The actuators 5*a* to 5*f* may be incorporated in a machine other than the robot 1, for example, a machine tool. Though the actuator 5 will be described below, the actuators 5*a* to 5*f* shown in FIG. 1 also have the same configuration.

Figure 2:
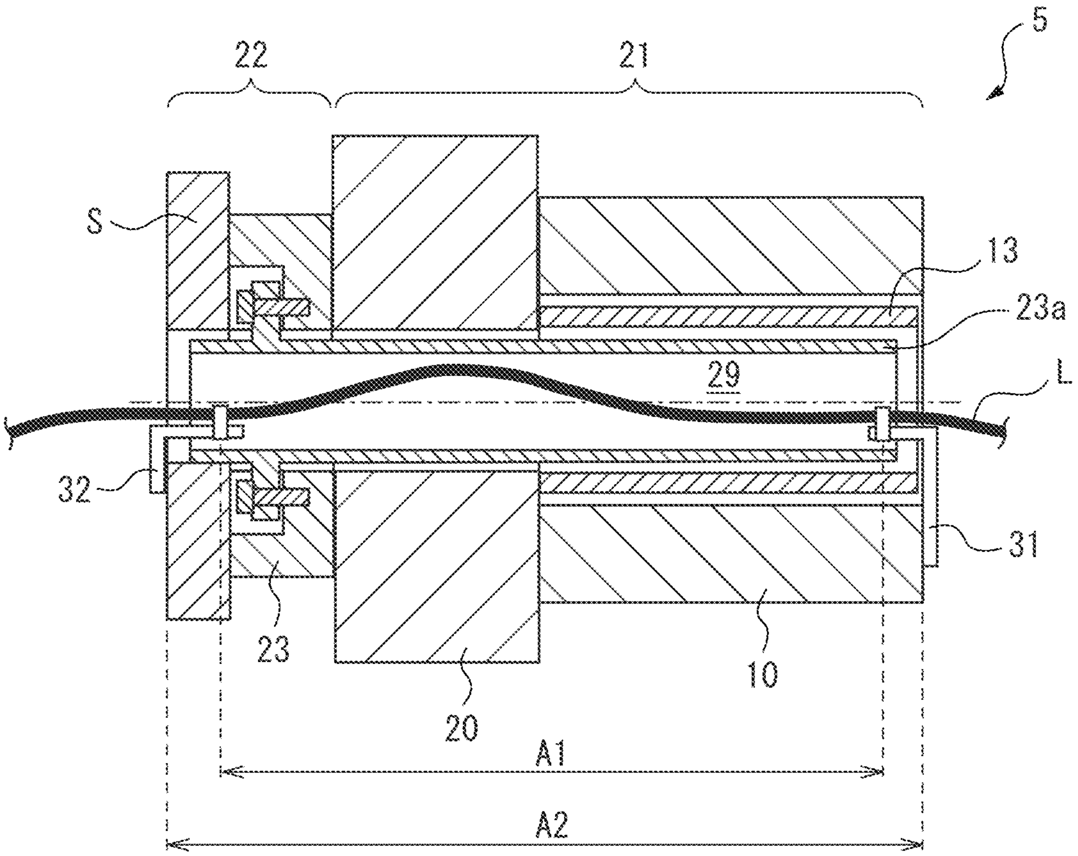
FIG. 2 is an axial cross-sectional view of the actuator based on the first embodiment.

FIG. 2 is an axial cross-sectional view of the actuator according to the first embodiment. The actuator 5 is mainly composed of a fixed member 21 and a movable member 22 which rotates relatively to the fixed member 21. Specifically, the fixed member 21 comprises a motor 10, for example, a servo motor, composed of a stator and a rotor, and a speed reducer 20 connected to a motor shaft 13 of the motor 10. The movable member 22 comprises an output shaft 23 of the speed reducer 20 and a force sensor S coupled to the output shaft 23. As will be described later, the movable member 22 may be configured so as to include only the output shaft 23 of the speed reducer 20.

In the present disclosure, the speed reducer 20 is defined as being arranged in front of the motor 10, and the motor 10 is defined as being arranged behind the speed reducer 20. Furthermore, in principle, the "radial direction" in the present disclosure means the radial direction of the actuator 5, etc., and the "axial direction" means the axial direction of the actuator 5, etc.

The motor shaft 13 of the motor 10 is connected to the speed reducer 20. The tip of the output shaft 23 of the speed reducer 20 is connected to a link 2 (not illustrated) via the force sensor S. Thus, the actuator 5 controls the positioning of the link 2 (not illustrated) by rotating the link 2 relative to the actuator 5 within a predetermined operating range. The reduction ratio of the speed reducer 20 is, for example, 1:50.

The motor shaft 13 is, for example, a hollow shaft. An extension part 23*a*, for example, a pipe member, is coupled to the output shaft 23 of the speed reducer 20, and this extension part 23*a* passes through the hollow motor shaft 13 and extends toward the motor 10. The output shaft 23 of the speed reducer 20 and the extension part 23*a* may be integrally formed. In other words, the extension part 23*a* may be a portion of the output shaft 23. Thus, hereinafter, the "extension part 23*a*" may be expressed as the "output part 23."

Figure 7A:
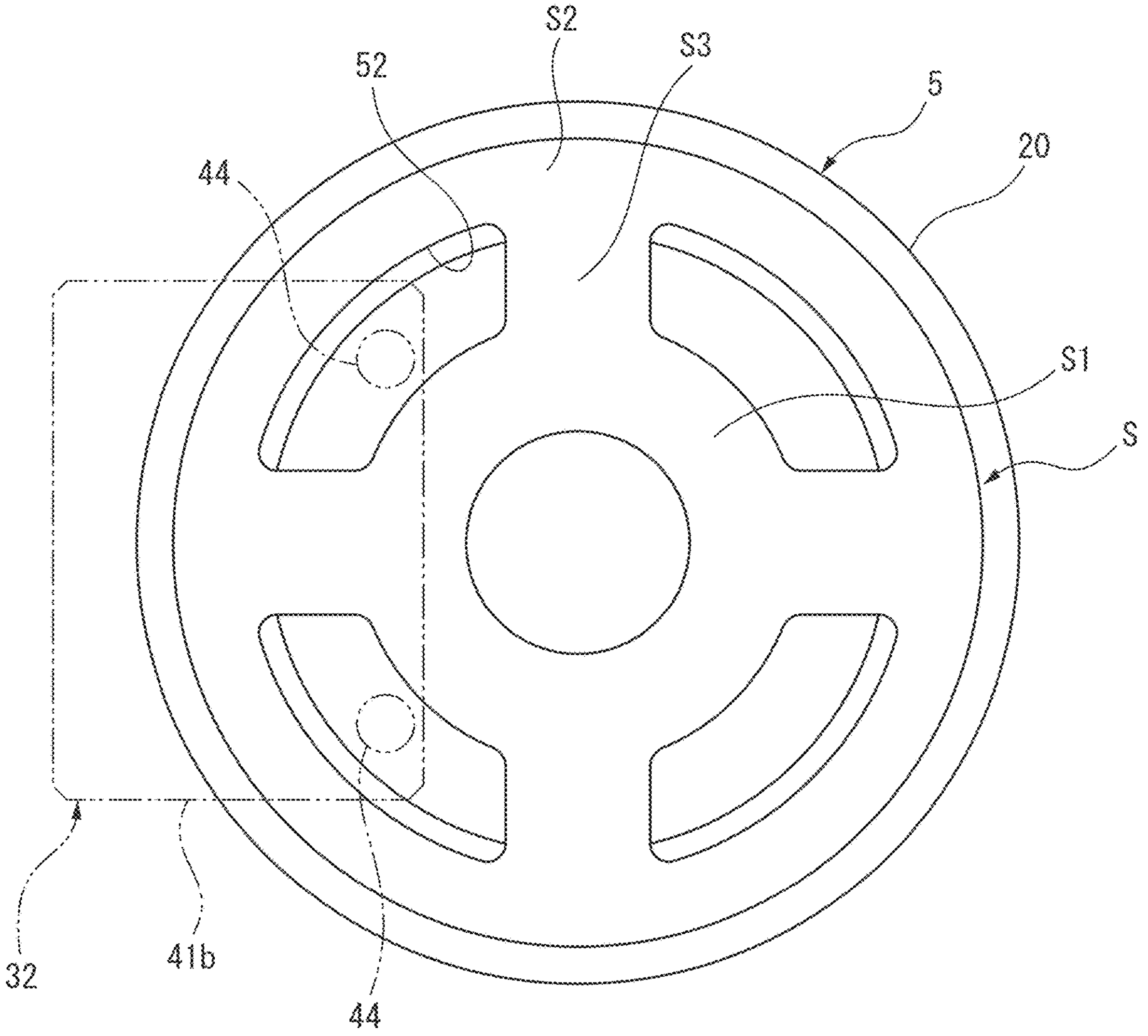
FIG. 7A is an end view of an actuator according to a modification example.

The force sensor S is composed of a torque sensor for detecting the force acting around the axis of the actuator 5. As shown in FIG. 7A, which will be described later, the force sensor S generally comprises a sensor component S1, a sensor component S2, and a strain detection unit S3 which connects between them. Since the rigid strain detection unit S3 elastically deforms in a direction which slightly extends when a force acts around the axis of the actuator 5, the force acting around the axis can be detected by the deformation amount of the strain detection unit S3. The force sensor S may be a strain gauge, a capacitance sensor, a magnetic sensor, an optical encoder, etc.

As shown in the drawing, the force sensor S, the speed reducer 20, and the motor 10, which are coaxially connected to each other, have a common hollow hole 29. It is preferable that the hollow holes 29 of the force sensor S, the speed reducer 20, and the motor 10 have a common inner diameter. As a result, the extension part 23*a*, for example, a pipe member, can smoothly be arranged. In other words, the actuator 5 has a hollow hole 29 which penetrates the entire actuator 5 formed in the axial direction. The hollow hole 29 is formed by the inner peripheral surface of the motor 10, the inner peripheral surface of the speed reducer 20, and the inner peripheral surface of the force sensor S. Thus, the hollow hole 29 includes the extension part 23*a* and the motor shaft 13 located outside the extension part 23*a*. As shown in the drawing, the extension part 23*a* extends over substantially the entire length of the actuator 5. It is preferable that the extension part 23*a* be shorter than the entire length of the actuator 5. At least one filamentary body L, such as a signal line or a current supply line, passes through the interior of the extension part 23*a*.

As shown in FIG. 2, a portion of the filamentary body L is affixed to the fixed member 21 by a first fixed part 31. The other portion of the filamentary body L is affixed to the movable member 22 by a second fixed part 32.

In FIG. 2, the first fixed part 31 is affixed to the rear end surface of the motor 10, and the second fixed part 32 is affixed to a front end surface close to the inner periphery of the sensor S, which does not affect the detection of the sensor S. However, when the actuator 5 is the actuator 5*d* mounted on the robot 1, the first fixed part 31 may be affixed to an arm member 62 on the arm affixation (non-rotating) side, and the second fixed part 32 may be affixed to another arm member 61 on the arm rotation side adjacent to the arm member 62. It will be assumed below that the first fixed part 31 is affixed to the rear end surface of the fixed member 21, the fixed member 21 is connected to the arm member 61, the second fixed part 32 is affixed to the front end surface of the movable member 22, and the movable member 22 is connected to the arm member 61. Regarding the mounting direction of the actuator, the force sensor S may be connected to the arm member 62 on the affixation (non-rotating) side of the arm, and the fixed member 21 may be connected to the arm member 61 on the arm rotation side.

Figure 3A:
FIG. 3A is a view showing a first fixed part and a second fixed part.
Figure 3B:
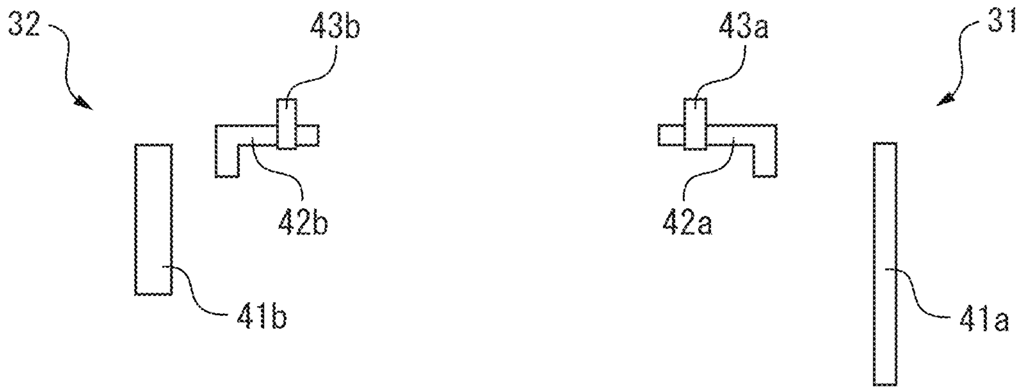
FIG. 3B is an exploded view of the first fixed part and the second fixed part shown in FIG. 3A.

FIG. 3A is a view showing the first fixed part and the second fixed part, and FIG. 3B is an exploded view of the first fixed part and the second fixed part shown in FIG. 3A. As shown in these drawings, the first fixed part 31 includes a plate part 41*a* to be affixed to the fixed member 21, a bracket 42*a* extending perpendicular to the plate part 41*a*, and a first gripping part 43*a* attached to the bracket 42*a*. Likewise, the second fixed part 32 includes a plate part 41*b* to be affixed to the movable member 22, a bracket 42*b* extending perpendicular to the plate part 41*b*, and a second gripping part 43*b* attached to the bracket 42*b*.

Fixtures such as bolts may affix between the fixed member 21 and the plate part 41*a* and between the movable member 22 and the plate part 41*b*. Any fixtures may be used as long as it can facilitate attachment and detachment. Likewise, Fixtures such as bolts or an adhesive may affix between the plate part 41*a* and the bracket 42*a* and between the plate part 41*b* and the bracket 42*b*. The first gripping part 43*a* and the second gripping part 43*b* serve to partially grip the filamentary body L. The first gripping part 43*a* and the second gripping part 43*b* may be, for example, pressing clamp members or resin bands. The first gripping part 43*a* and the second gripping part 43*b* may be structured to grip the filamentary body L by wrapping it in a protective member such as a rubber sheet.

As can be understood with reference again to FIG. 2, the plate part 41*a* of the first fixed part 31 is arranged outside the fixed member 21, and the plate part 41*b* of the second fixed part 32 is arranged outside the movable member 22. The bracket 42*a* attached to the plate part 41*a* enters the interior of the hollow hole 29 from one end of the actuator 5, and the bracket 42*b* attached to the plate part 41*b* enters the interior of the hollow hole 29 from the other end of the actuator 5. Thus, the length A1 between the first gripping part 43*a* and the second gripping part 43*b* on a line segment parallel to the central axis of the actuator 5 is shorter than the net length A2 in the axial direction of the hollow hole 29.

Note that the length A1 between the first gripping part 43*a* and the second gripping part 43*b* means the length measured when the phase of the first gripping part 43*a* and the phase of the second gripping part 43*b* around the rotation axis are consistent and when the first gripping part 43*a* and the second gripping part 43*b* are affixed relatively immovably to the hollow hole 29.

Figure 4:
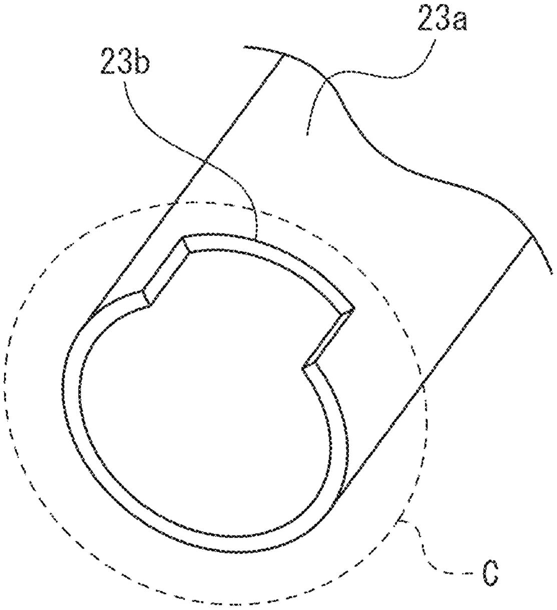
FIG. 4 is a partial perspective view of a pipe member.

FIG. 4 is a partial perspective view of a pipe member. In FIG. 4, a notch 23*b* extending in the circumferential direction is formed at one end of the extension part 23*a*. FIG. 4 also shows an area C including the notch 23*b*. The case in which the notch 23*b* is formed in the extension part 23*a* in this manner is also included in the scope of the present disclosure.

The length from one end of the extension part 23*a* to the first gripping part 43*a* is preferably less than half the axial length A2 of the extension part 23*a*. Likewise, the length from the other end of the extension part 23*a* to the second gripping part 43*b* is preferably less than half the axial length A2 of the extension part 23*a*.

More specifically, the length from one end of the extension part 23*a* to the first gripping part 43*a* and the length from the other end of the extension part 23*a* to the second gripping part 43*b* are preferably equal to or less than one-fourth of the axial length A2. This is to prevent the weight of the brackets 42*a*, 42*b* comprising the gripping parts 43*a*, 43*b* from increasing. Furthermore, as will be described later, this is to facilitate the affixing operations of the first fixed part 31 and the second fixed part 32.

As can be understood from FIG. 2, the filamentary body L has a predetermined slack between the first gripping part 43*a* and the second gripping part 43*b*. Specifically, the length of the portion of the filamentary body L between the first gripping part 43*a* and the second gripping part 43*b* and is gripped by the first gripping part 43*a* and the second gripping part 43*b* is longer than the net length A2 of the hollow hole 29 in the axial direction.

In the present disclosure, both the first gripping part 43*a* of the first fixed part 31 and the second gripping part 43*b* of the second fixed part 32 are positioned in the interior of the hollow hole 29. In other words, only the plate parts 41*a*, 41*b* of the first fixed part 31 and the second fixed part 32 are exposed to the outside of the actuator 5. Further, since the plate parts 41*a*, 41*b* are, for example, metal plates having a predetermined thickness, the exposed portions thereof are extremely small.

In this manner, in the present disclosure, the first gripping part 43*a* and the second gripping part 43*b* are positioned in the interior of the hollow hole 29, and the exposed portions of the plate parts 41*a*, 41*b* are extremely small. Thus, an increase in size of the actuator 5 can be prevented. Furthermore, an increase in size of the robot 1 comprising the actuators 5*a* to 5*f* can be prevented.

The filamentary body L has a predetermined slack between the first gripping part 43*a* and the second gripping part 43*b*. Thus, even if the fixed member 21 and the movable member 22 rotate relatively when the actuator 5 is incorporated into the joint of the robot 1, the slack absorbs the twisting of the filamentary body L. In other words, damage to the filamentary body L due to excessive stress being applied to the filamentary body L can be prevented, and kinking of the filamentary body L can be prevented.

If the filamentary body L is affixed to the first fixed part 31 and the second fixed part 32 in a state in which the two fixed parts 31, 32 of the filamentary body L are completely exposed to the outside, and then the first gripping part 43*a* and the second gripping part 43*b* on the first fixed part 31 and the second fixed part 32 are both inserted into the hollow hole interior of the extension part 23*a*, the amount of slack in the filamentary body L becomes excessive. In such a case, the filamentary body L is pressed strongly against the inner surface of the hollow hole, which may result in a large stress acting on the filamentary body L, thus shortening the lifespan of the filamentary body L.

Figure 9:
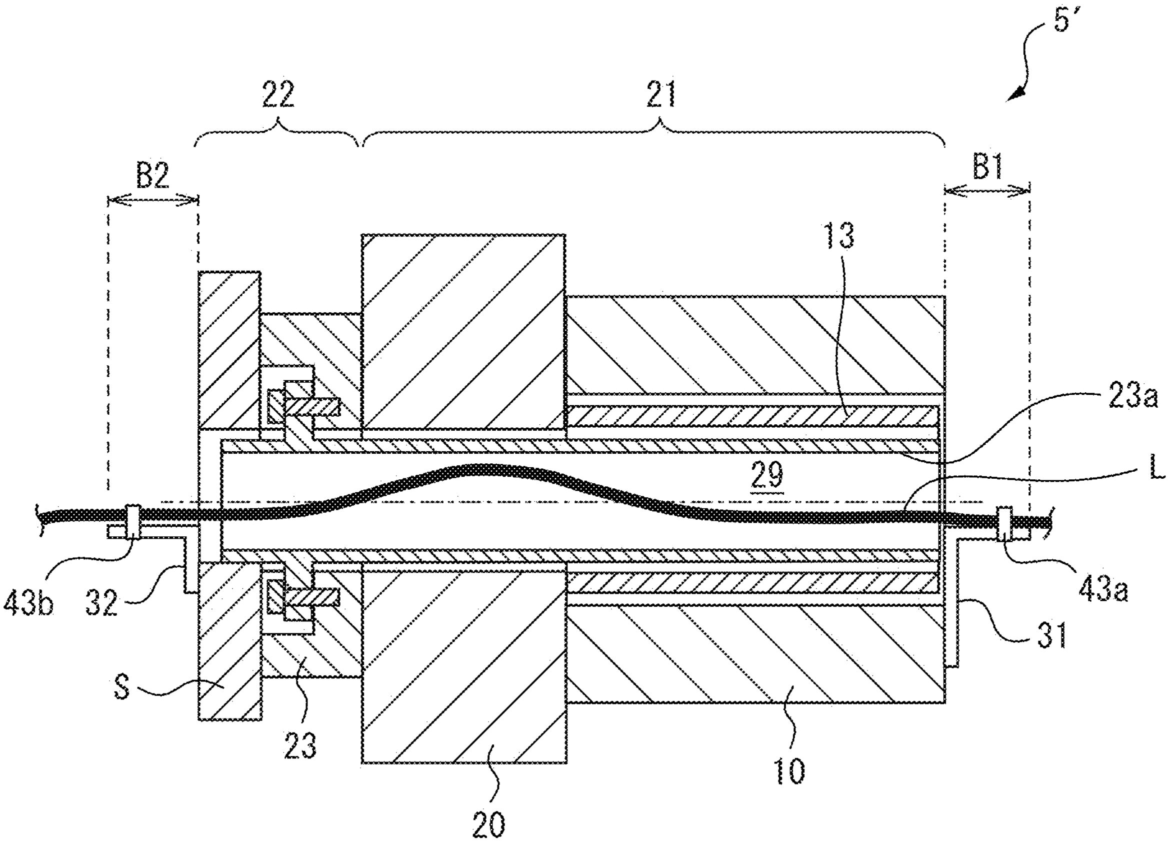
FIG. 9 is an axial cross-sectional view of an actuator according to the prior art.

FIG. 9 is an axial cross-sectional view of an actuator according to the prior art. In FIG. 9, the first gripping part 43*a* of the first fixed part 31 protrudes outward from one end of the hollow hole 29 by a protrusion amount B1, and the second gripping part 43*b* of the second fixed part 32 protrudes outward from the other end of the hollow hole 29 by a protrusion amount B2. Thus, the actuator 5' has a drawback in that it becomes larger in the axial direction by the protrusion amounts B1, B2. As a result, the housing (not illustrated) of a robot comprising a plurality of the actuators 5' also becomes larger in accordance with the lengths of the actuators 5'.

Figure 5A:
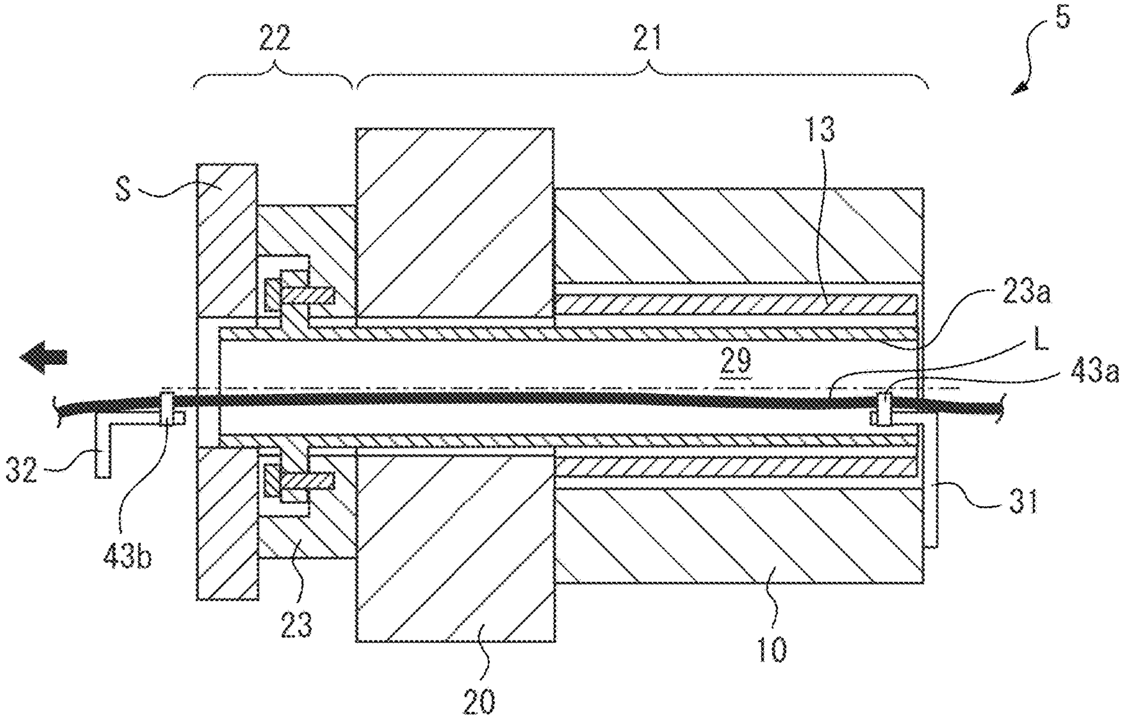
FIG. 5A is a first view showing a production method for the actuator shown in FIG. 2.
Figure 5B:
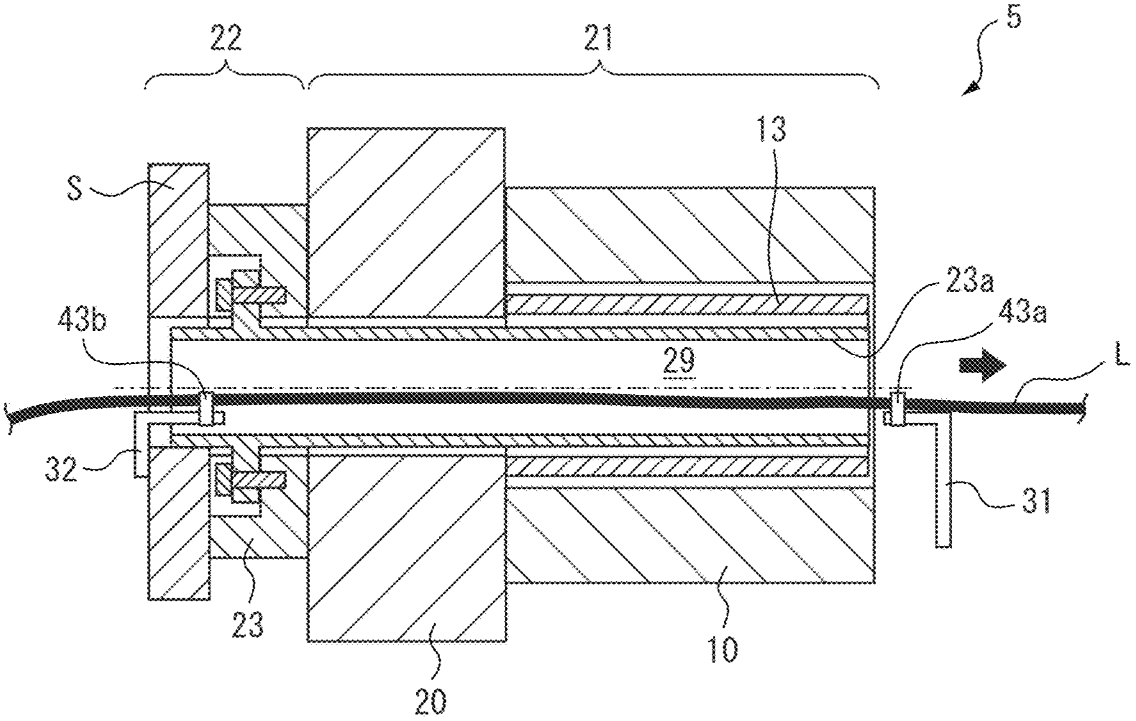
FIG. 5B is a second view showing a production method for the actuator shown in FIG. 2.

FIGS. 5A and 5B are views showing a production method for the actuator shown in FIG. 2. In an initial stage, the first fixed part 31 and the second fixed part 32 have already been assembled as shown in FIG. 3A, and both the first fixed part 31 and the second fixed part 32 are not affixed to the actuator 5.

As shown in FIG. 5A, the filamentary body L is passed through the hollow hole 29, and a portion of the filamentary body L is "temporarily affixed" to the first gripping part 43*a* of the first fixed part 31. Then, the filamentary body L is pulled in the direction of the arrow in FIG. 5A to fully extend the filamentary body L. As a result, the plate part 41*a* of the first fixed part 31 abuts against the rear end surface of the fixed member 21. In this state, the second gripping part 43*b* of the second fixed part 32 is caused to properly grip the other portion of the filamentary body L. As can be seen from FIG. 5A, the gripping operation of the filamentary body L by the second gripping part 43*b* is performed outside the actuator 5.

Then, as indicated by the arrow in FIG. 5B, the filamentary body L is pulled in the opposite direction to fully extend the filamentary body L. As a result, the plate part 41*b* of the second fixed part 32 abuts against the front end surface of the movable member 22, and the plate part 41*a* of the first fixed part 31 moves away from the fixed member 21. In this state, the plate part 41*b* of the second fixed part 32 is affixed to the end surface of the movable member 22 as described above. Furthermore, the first gripping part 43*a* of the first fixed part 31 is caused to properly grip the portion of the filamentary body L described above. The gripping operation of the filamentary body L by the first gripping part 43*a* is performed outside the actuator 5.

Thereafter, the plate part 41*a* of the first fixed part 31 is affixed to the end surface of the fixed member 21. As a result, as described above, the filamentary body L has a predetermined slack between the first gripping part 43*a* and the second gripping part 43*b*, and the length of the slack is longer than the axial length A2 of the hollow hole 29. As described above, the affixing operations of affixing the plate parts 41*a*, 41*b* to the fixed member 21 and the movable member 22, respectively, and the gripping operations of the filamentary body L by the first gripping part 43*a* and the second gripping part 43*b* are performed outside the actuator 5. It will be understood that the affixing operations by the first fixed part 31 and the second fixed part 32 can therefore be performed smoothly and easily.

The production procedure is not limited to the foregoing. The affixation of the first fixed part 31 and the second fixed part 32 may be full affixation instead of temporary affixation. In this case, it is necessary to mark the affixation positions on the filamentary body L in advance so that the distance between the clamps is accurate. The plate part 41*a* and the plate part 41*b* are attached to the actuator 5 in advance, and after the filamentary body L is affixed only with the bracket 42*a* and the bracket 42*b*, the bracket 42*a* and the bracket 42*b* may be affixed to the plate part 41*a* and the plate part 41*b*, respectively, to provide optimal slack. Regarding the order of affixation, the affixation operations may start from either of the two fixed parts 31, 32.

Figure 6A:
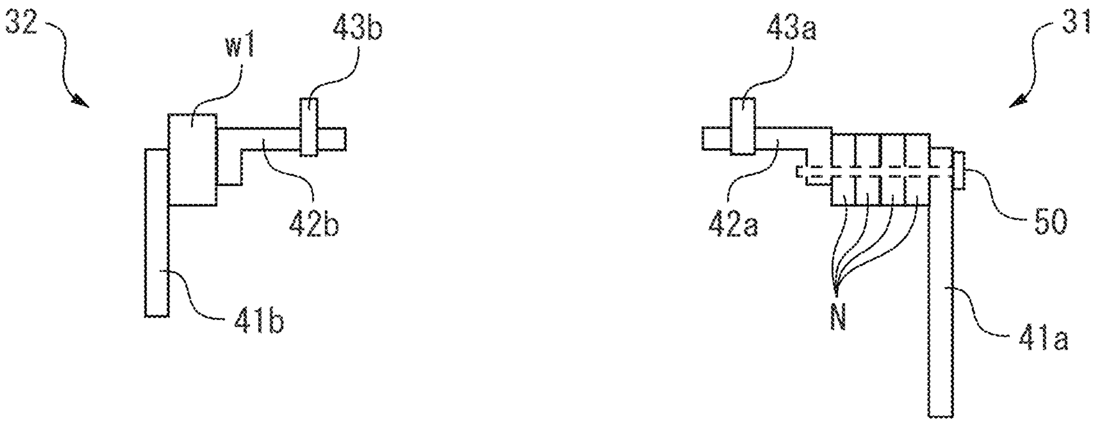
FIG. 6A is another view showing the first fixed part and the second fixed part.
Figure 6B:
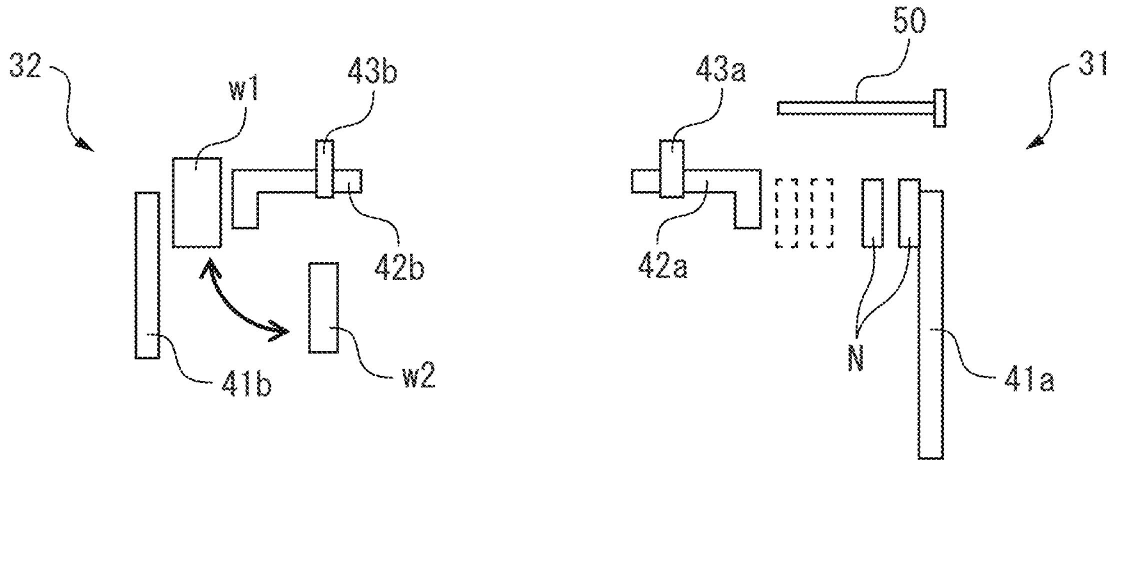
FIG. 6B is an exploded view of the first fixed part and the second fixed part shown in FIG. 6A.

FIG. 6A is another view showing a first fixed part and a second fixed part, and FIG. 6B is an exploded view of the first fixed part and the second fixed part shown in FIG. 6A. The first fixed part 31 shown in these drawings includes at least one ring-shaped spacer N (four ring-shaped spacers N in FIG. 6A) between the plate part 41*a* and the bracket 42*a*. As shown in the drawings, a bolt 50 connects the plate part 41*a*, the at least one ring-shaped spacer N, and the bracket 42*a* to each other. Alternatively, the plate part 41*a*, the at least one ring-shaped spacer N, and the bracket 42*a* may be connected by another method, for example, an adhesive, without using the bolt 50.

Furthermore, the second fixed part 32 includes a single spacer W1 having a predetermined dimension between the plate part 41*b* and the bracket 42*b*. The plate part 41*b*, the spacer W1, and the bracket 42*b* may be bonded together by an adhesive, or may be bonded together by a bolt (not illustrated).

Due to the presence of the at least one ring-shaped spacer N and the spacer W1, the gripping positions of the filamentary body L gripped by the first gripping part 43*a* and the second gripping part 43*b* move to the axial center position of the hollow hole 29. In other words, the two gripping positions of the filamentary body L shift farther from one end toward the other end of the hollow hole 29. As a result, the presence of the at least one ring-shaped spacer N and the spacer W1 increases the amount of slack of the filamentary body L.

The left side of FIG. 6B shows an embodiment in which the spacer W1 is replaced with another spacer W2 which is larger than the spacer W1 and the spacer W2 is arranged between the plate part 41*b* and the bracket 42*b*. This causes the second gripping part 43*b* of the second fixed part 32 to shift further away from the end of the hollow hole 29, and as a result, the amount of slack in the filamentary body L is further increased.

The right side of FIG. 6B shows an embodiment in which two of the four ring-shaped spacers N are removed and the remaining two ring-shaped spacers N are arranged between the plate part 41*a* and the bracket 42*a*. By reducing the number of ring-shaped spacers N, the first gripping part 43*a* of the first fixed part 31 approaches the end of the hollow hole 29, and as a result, the amount of slack in the filamentary body L is reduced.

By using the at least one ring-shaped spacer N and/or spacers W1, W2 in this manner, the amount of slack of the filamentary body L can be changed. In other words, at least one ring-shaped spacer N, bolt 50, and spacers W1, W2 serve as an adjustment mechanism for adjusting the amount of slack of the filamentary body L. By employing such an adjustment mechanism, the amount of slack of the filamentary body L in the interior of the hollow hole 29 can easily be adjusted even after the first fixed part 31 and the second fixed part 32 are affixed to the actuator 5. Note that the use of an annular member such as a washer instead of the ring-shaped spacer N is within the scope of the present disclosure.

Figure 7B:
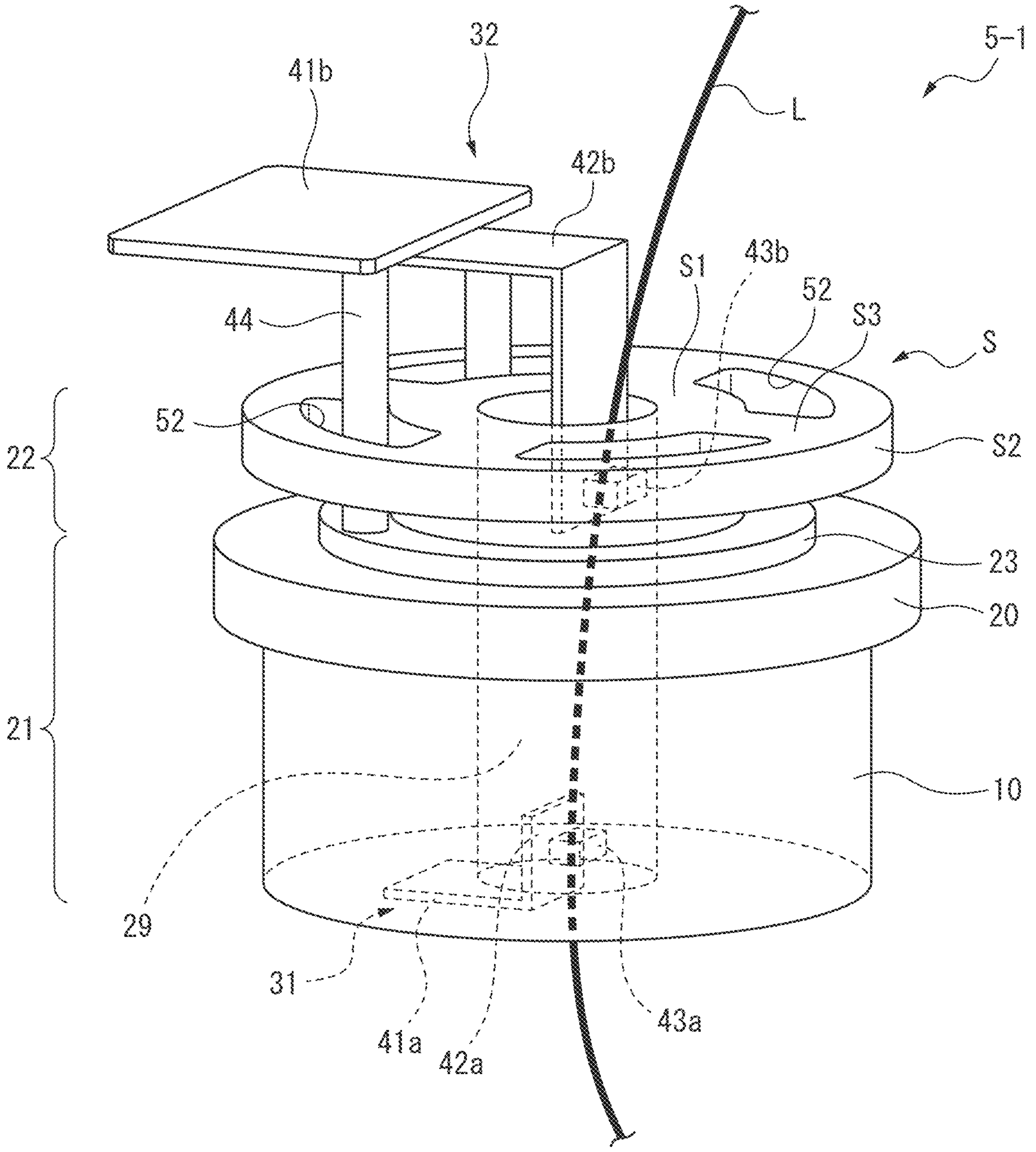
FIG. 7B is a perspective view of the actuator shown in FIG. 7A.

FIG. 7A is an end view of the actuator of a modification example, and FIG. 7B is a perspective view of the actuator shown in FIG. 7A. As shown in FIG. 7A, the sensor S includes two sensor components S1, S2 arranged concentrically. Furthermore, the sensor S includes a plurality of strain detection units S3 which connect the sensor components S1, S2 and extend in the radial direction of the actuator 5-1. Furthermore, the sensor S has a plurality of openings 52 which are surrounded by the sensor components S1, S2 and the strain detection units S3. As described above, the sensor S detects force acting around the axis of the actuator 5-1 through the elastic deformation of the strain detection unit S3.

The movable member 22 of the actuator 5 shown in FIG. 2, etc., includes the sensor S. Thus, the plate part 41*b* of the second fixed part 32 can be directly attached to the end surface of the sensor S. However, if at least a portion of the second fixed part 32 is in partial contact with the sensor S or if the filamentary body L is directly affixed onto the sensor S, the sensitivity of the sensor S may be adversely affected, and the sensor S may output an undesirable detection result.

In the modification examples shown in FIGS. 7A and 7B, a plurality of rod-shaped members 44 extend from the plate part 41*b* of the second fixed part 32. The plurality of rod-shaped members 44 are affixed to the end surface of the output part 23 through the opening 52 of the sensor S. Thus, in the modification example, the second fixed part 32 is affixed to the movable member 22 of the actuator 5-1 without contacting the sensor S. In such a case, due to the presence of the second fixed part 32, the sensor S is not directly subjected to a torsional reaction force from the filamentary body L, and thus, it will be understood that suitable force control can be performed using the sensor S.

Figure 8A:
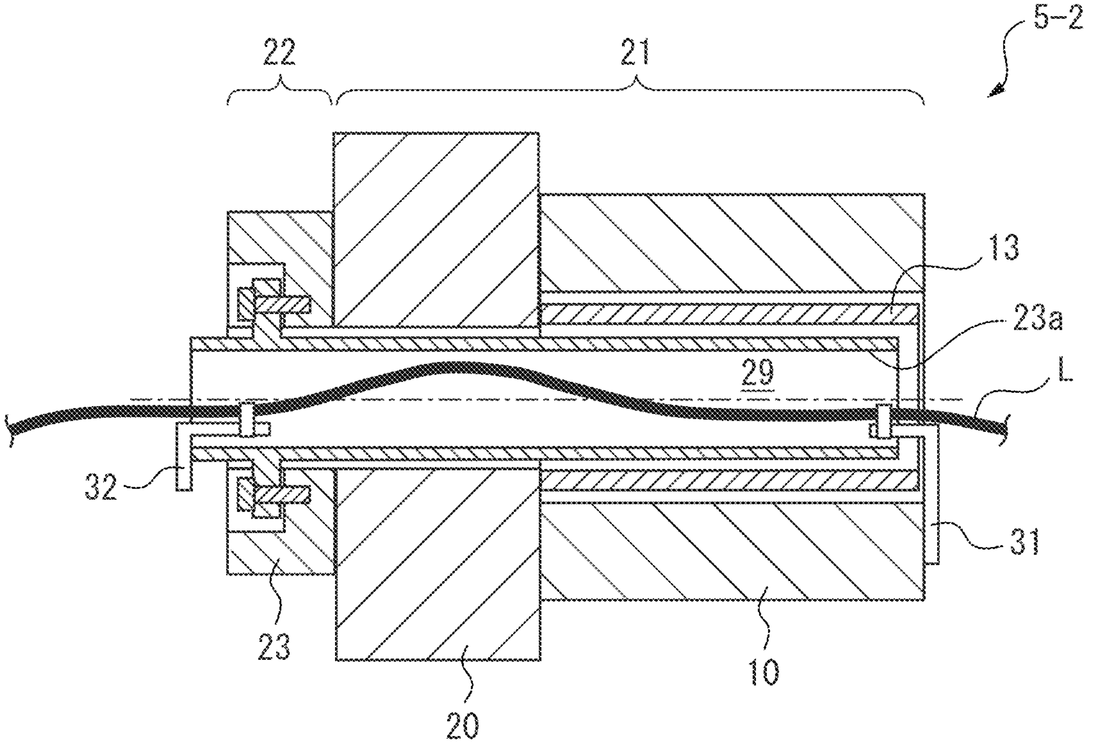
FIG. 8A is an axial cross-sectional view of an actuator based on a second embodiment.
Figure 8B:
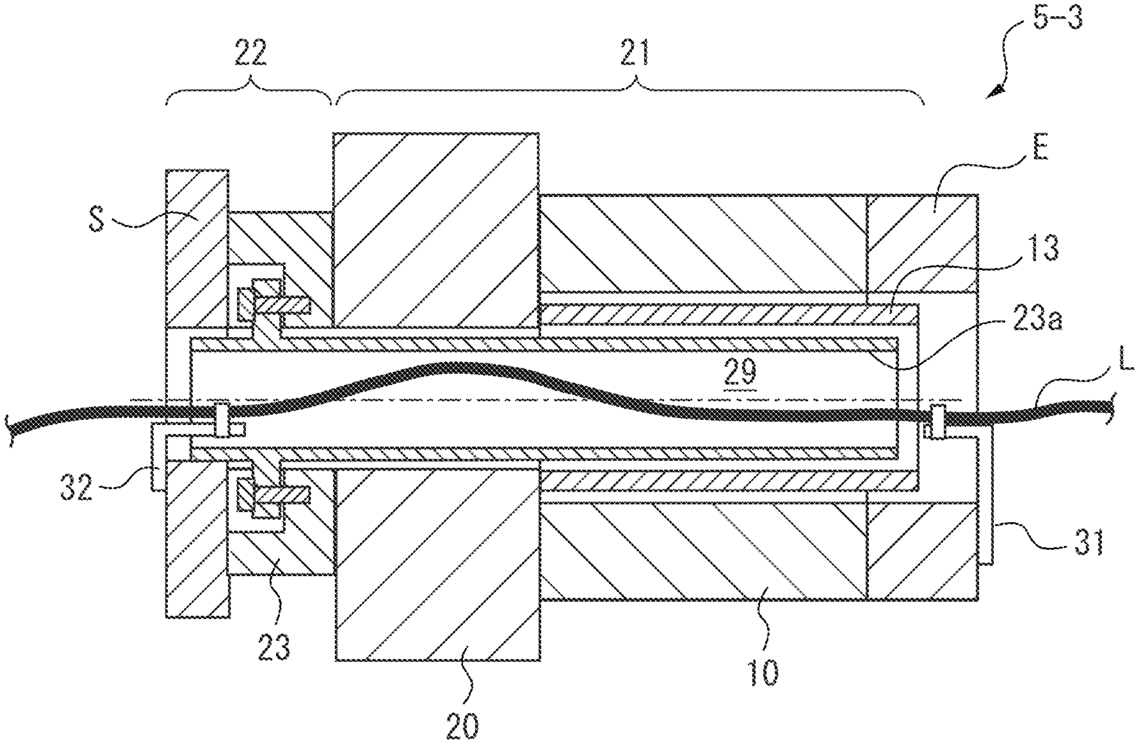
FIG. 8B is an axial cross-sectional view of an actuator based on a third embodiment.

FIG. 8A is an axial cross-sectional view of an actuator based on a second embodiment, and FIG. 8B is an axial cross-sectional view of an actuator based on a third embodiment. The actuator 5-2 shown in FIG. 8A does not include a sensor S. Specifically, the movable member 22 of the actuator 5-2 includes only the output part 23. The second fixed part 32 is affixed to the end surface of the extension part 23*a*, and specifically, the end of the hollow hole 29. The fixed member 21 includes the speed reducer 20 and the motor 10.

The actuator 5-3 shown in FIG. 8B comprises an encoder E on the rear end side of the motor 10. The encoder E detects the rotation speed of the motor shaft 13 and the rotation speed of the extension part 23*a* by a known method. Thus, the fixed member 21 includes the speed reducer 20, the motor 10, and the encoder E. Therefore, in FIG. 8B, the first fixed part 31 is attached to the rear end of the encoder E. The movable member 22 includes the output part 23 and the sensor S. Though not illustrated, a driver with a hollow structure may be further mounted on the right side (rear end side) of the encoder E.

In this manner, the fixed member 21 and movable member 22 of the actuator are not limited to the configuration shown in FIG. 2, and the scope of the present disclosure also includes cases in which the fixed member 21 includes an encoder E and in which the movable member 22 does not include a sensor S.

At least one of the embodiments described above has the advantage that the first gripping part and the second gripping part are positioned in the interior of the hollow hole 29, whereby the actuator and the robot comprising such an actuator can be prevented from becoming large.

Though the embodiments of the present disclosure have been described in detail, the present disclosure is not limited to the individual embodiments described above. Various additions, replacements, modifications, or partial deletions can be made to these embodiments within the scope of the spirit of the invention, or within the scope of the idea and intent of the present invention derived from the contents described in the claims and their equivalents. For example, the order of each operation and the order of each process of the embodiments described above are shown as examples, and are not limited to these. The same applies when numerical values or formulas are used in the description of the embodiments described above. Furthermore, appropriate combinations of some of the embodiments described above are included in the scope of the present disclosure.

In relation to the embodiments and modification examples described above, the following Addenda are further disclosed.

Addendum 1

An actuator comprising:

a fixed member, a movable member which rotates relative to the fixed member, a hollow hole which penetrates the actuator,

- a filamentary body which passes through an interior of the hollow hole,
- a first fixed part including a first gripping part for gripping a portion of the filamentary body, and
- a second fixed part including a second gripping part for gripping another portion of the filamentary body, wherein
- the first gripping part and the second gripping part are positioned inside the hollow hole,
- a distance between the first gripping part and the second gripping part is shorter than a length of the hollow hole, and
- a length of the filamentary body between the first gripping part and the second gripping part gripped by the first gripping part and the second gripping part is longer than a length of the hollow hole.

Addendum 2

The actuator according to Addendum 1, wherein the filamentary body gripped by the first gripping part and the second gripping part has a predetermined amount of slack between the first gripping part and the second gripping part.

Addendum 3

The actuator according to Addendum 1 or 2, wherein the first gripping part and the second gripping part are configured to be detachable from remaining portions of the first fixed part and remaining portions of the second fixed part, respectively.

Addendum 4

The actuator according to any one of Addenda 1 to 3, further comprising an adjustment mechanism with which slack of the filamentary body can be adjusted.

Addendum 5

The actuator according to any one of Addenda 1 to 4, wherein the first fixed part is affixed to the fixed member, and the second fixed part is affixed to the movable member.

Addendum 6

A robot, comprising at least one of the actuator according to any one of Addenda 1 to 5.

REFERENCE SIGNS LIST

1 robot
5, 5-1, 5-2 actuator
10 motor
13 motor shaft
20 speed reducer
21 fixed member
22 movable member

23 output part
23*a* extension part
29 hollow hole
31 first fixed part
32 second fixed part
41*a*, 41*b* plate part
42*a*, 42*b* bracket
43*a* first gripping part
43*b* second gripping part
50 bolt (adjustment mechanism)
61, 62 arm member
E encoder
L filamentary body
N ring-shaped spacer (adjustment mechanism)
S force sensor
W1, W2 spacer (adjustment mechanism)

What is claimed is:

1. An actuator comprising:
- a fixed member,
- a movable member which rotates relative to the fixed member,
- a hollow hole which penetrates only the fixed member and the movable member,
- a filamentary body which passes through an interior of the hollow hole,
- a first fixed part including a first gripping part for gripping a portion of the filamentary body, and
- a second fixed part including a second gripping part for gripping another portion of the filamentary body, wherein
- the first gripping part and the second gripping part are positioned inside the hollow hole,
- a distance between the first gripping part and the second gripping part is shorter than a length of the hollow hole, and
- a length of the filamentary body between the first gripping part and the second gripping part gripped by the first gripping part and the second gripping part is longer than a length of the hollow hole.

2. The actuator according to claim 1, wherein the filamentary body gripped by the first gripping part and the second gripping part has a predetermined amount of slack between the first gripping part and the second gripping part.

3. The actuator according to claim 1, wherein the first gripping part and the second gripping part are configured to be detachable from remaining portions of the first fixed part and remaining portions of the second fixed part, respectively.

4. The actuator according to claim 1, further comprising an adjustment mechanism with which slack of the filamentary body can be adjusted.

5. The actuator according to claim 1, wherein the first fixed part is affixed to the fixed member, and the second fixed part is affixed to the movable member.

6. A robot, comprising at least one actuator according to claim 1.

* * * * *